(12) United States Patent
Naraki et al.

(10) Patent No.: US 11,713,363 B2
(45) Date of Patent: Aug. 1, 2023

(54) APPARATUS AND METHOD FOR MANUFACTURING HIGH-PRESSURE METHOD LOW-DENSITY POLYETHYLENE

(71) Applicant: Sumitomo Chemical Company, Limited, Tokyo (JP)

(72) Inventors: Kensuke Naraki, Ichihara (JP); Takayuki Mino, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 17/532,934

(22) Filed: Nov. 22, 2021

(65) Prior Publication Data
US 2022/0169754 A1 Jun. 2, 2022

(30) Foreign Application Priority Data
Nov. 30, 2020 (JP) .................. 2020-198195

(51) Int. Cl.
C08F 2/01 (2006.01)
B01J 4/00 (2006.01)
B01J 12/00 (2006.01)
C08F 110/02 (2006.01)

(52) U.S. Cl.
CPC .............. C08F 2/01 (2013.01); B01J 4/001 (2013.01); B01J 12/00 (2013.01); C08F 110/02 (2013.01)

(58) Field of Classification Search
USPC .................................. 526/64, 68
See application file for complete search history.

(56) References Cited

U.S. PATENT DOCUMENTS

| 4,217,431 A * | 8/1980 | Zacher ................. C08F 210/02 526/64 |
| 2015/0011717 A1 * | 1/2015 | Garland, Jr. ........... C08F 10/02 526/64 |

FOREIGN PATENT DOCUMENTS

| JP | S4937434 B1 | 10/1974 |
| JP | S5164587 A | 6/1976 |
| JP | S5415317 B2 | 6/1979 |

OTHER PUBLICATIONS

Bell, S. L., "Low Density Polyethylene," SRI Consulting, Report No. 36D, 3 pages (2005).

* cited by examiner

Primary Examiner — Fred M Teskin
(74) Attorney, Agent, or Firm — Panitch Schwarze Belisario & Nadel LLP

(57) ABSTRACT

Provided are an apparatus and a method for manufacturing high-pressure method low-density polyethylene, the apparatus and the method having excellent characteristics that the amount of smoke generated during processing of a polyethylene to be obtained is small, and the number of fish eyes contained in a film formed from the polyethylene is small. An apparatus for manufacturing high pressure method polyethylene includes: an ethylene supply line that is a line branched from a high pressure recycle ethylene line and connected to a recycle ethylene holding drum for decompressing high pressure recycle ethylene from the high pressure recycle ethylene line and supplying the decompressed recycle ethylene to the recycle ethylene holding drum; and the recycle ethylene holding drum that is a drum for holding the decompressed recycle ethylene through the ethylene supply line.

10 Claims, 1 Drawing Sheet

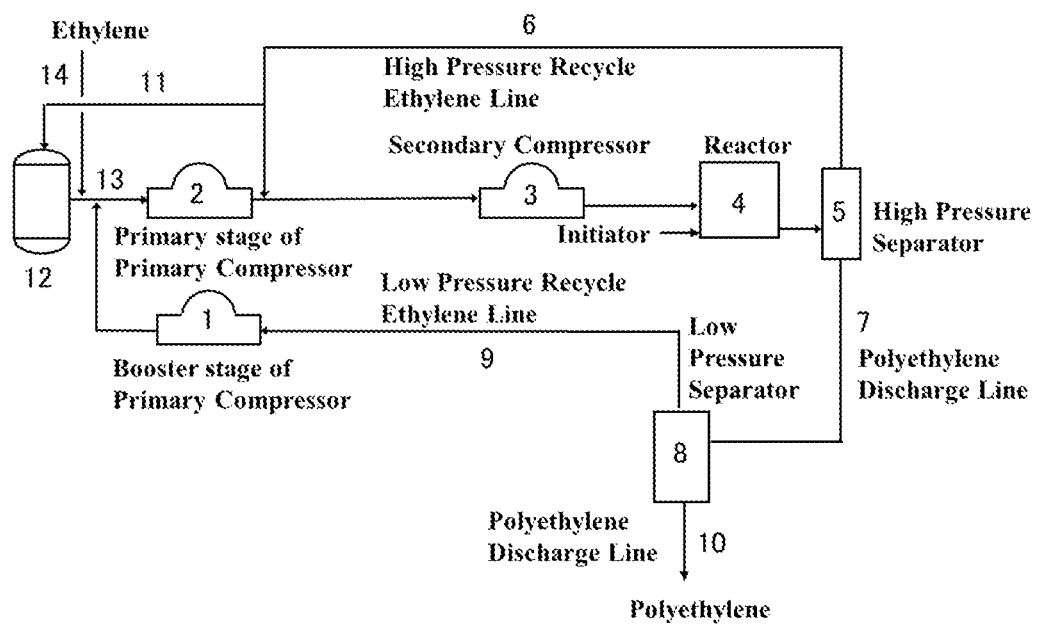

APPARATUS AND METHOD FOR MANUFACTURING HIGH-PRESSURE METHOD LOW-DENSITY POLYETHYLENE

CROSS-REFERENCE TO RELATED APPLICATIONS

This application claims priority under 35 U.S.C. § 119(b) to Japanese Application No. 2020-198195, filed Nov. 30, 2020, the disclosure of which is incorporated herein by reference in its entirety.

BACKGROUND OF THE INVENTION

Field of the Invention

The present invention relates to an apparatus and a method for manufacturing high-pressure method low-density polyethylene.

Description of the Related Art

An apparatus and a method for polymerizing ethylene at a high temperature and a high pressure in the presence of a polymerization initiator to obtain an ethylene polymer are known (for example, JP-B-49-37434, JP-B-54-15317, and SRI Consulting Report No. 36D, LOW DENSITY POLYETHYLENE by SUSAN L. BELL, September 2005). An ethylene polymer manufactured by such a high pressure polymerization method is used for a wide range of applications. Among these applications, applications used or handled in forms of a packaging film and other films account for a large proportion. In these applications, an excellent anti-blocking property of the film is required.

JP-B-49-37434 describes an apparatus and a method for manufacturing high pressure method polyethylene, the apparatus and the method each including a compressor, a reactor, a high pressure separator, a low pressure separator, and the like.

JP-B-54-15317 describes an apparatus and a method for manufacturing high pressure method polyethylene, the apparatus and the method each including a pre-stage compressor, a mid-stage compressor, a post-stage compressor, a reactor, a high pressure separator, a low pressure separator, and the like.

SRI Consulting Report No. 36D, LOW DENSITY POLYETHYLENE by SUSAN L. BELL, September 2005 describes, on pages 5-11 and 6-4, an apparatus for manufacturing high-pressure method low-density polyethylene, the apparatus including a booster compressor, a primary compressor, a hyper compressor, a tubular reactor or an autoclave reactor, a high pressure separator, a low pressure separator, and the like.

SUMMARY OF THE INVENTION

Under such circumstances, a problem to be solved by the present invention is to provide an apparatus and a method for manufacturing high-pressure method low-density polyethylene, the apparatus and the method having excellent characteristics that in ethylene high pressure polymerization (ethylene high pressure polymerization here includes not only homopolymerization of ethylene but also copolymerization), low molecular weight impurities including a polymerization by-product, a solvent, a lubricating oil, and the like are economically and effectively separated and removed from an ethylene high pressure polymer, the amount of smoke generated during processing of a polyethylene polymer to be obtained is small, and the number of fish eyes contained in a film formed from the polymer is small.

The present inventor has made intensive studies in view of such a background, and has completed the present invention.

That is, the present invention is as follows.

[1]

An apparatus for manufacturing high pressure method polyethylene, the apparatus including:

an ethylene supply line (11) that is a line branched from a high pressure recycle ethylene line (6) and connected to a recycle ethylene holding drum (12) for decompressing high pressure recycle ethylene from the high pressure recycle ethylene line (6) and supplying the decompressed recycle ethylene to the recycle ethylene holding drum (12); and the recycle ethylene holding drum (12) that is a drum for holding the decompressed recycle ethylene through the ethylene supply line (11).

Hereinafter, [2] to [10] are preferred aspects or embodiments of the present invention.

[2]

The manufacturing apparatus according to [1], in which the ethylene supply line (11) is a line branched from the high pressure recycle ethylene line (6) and connected to the recycle ethylene holding drum (12) for decompressing more than 0% by weight and 50% by weight or less of high pressure recycle ethylene from the high pressure recycle ethylene line (6) to a pressure within a range of 0.8 MPa to 3 MPa and supplying the decompressed recycle ethylene to the recycle ethylene holding drum (12).

[3]

The manufacturing apparatus according to [1] or [2], in which the recycle ethylene holding drum (12) is a drum for holding recycle ethylene decompressed to a pressure within a range of 0.8 MPa to 3 MPa at a temperature of −20° C. to 0° C. through the ethylene supply line (11).

[4]

The manufacturing apparatus according to any one of [1] to [3], further including:

a primary stage of primary compressor (2) that is a compressor that further compresses ethylene supplied from a booster stage of primary compressor (1);

a high pressure recycle ethylene line (6) that is a line for supplying high pressure recycle ethylene separated by a high pressure separator (5) to a secondary compressor (3); and an ethylene supply line (13) that is a line for connecting the recycle ethylene holding drum (12) to the primary stage of primary compressor (2) and supplying decompressed recycle ethylene from the recycle ethylene holding drum (12) to the primary stage of primary compressor (2).

[5]

The manufacturing apparatus according to any one of [1] to [4], further including:

a booster stage of primary compressor (1) that is a compressor that compresses ethylene;

a secondary compressor (3) that is a compressor that further compresses ethylene supplied from the primary stage of primary compressor (2);

a reactor (4) that is a reactor that polymerizes ethylene using ethylene supplied from the secondary compressor (3) and a polymerization initiator supplied to the reactor (4) to manufacture polyethylene;

a high pressure separator (5) that is a high pressure separator to which polyethylene obtained in the reactor (4) and recycle ethylene are supplied from the reactor (4) and which separates the polyethylene and the high pressure recycle ethylene from each other;

a polyethylene discharge line (7) that is a line for discharging polyethylene separated by the high pressure separator (5) from the high pressure separator (5) and supplying the polyethylene to a low pressure separator (8);

the low pressure separator (8) that is a separator that separates low pressure recycle ethylene contained in polyethylene separated by the high pressure separator (5) and supplied through the polyethylene discharge line (7) from the polyethylene;

a low pressure recycle ethylene line (9) that is a line for supplying low pressure recycle ethylene separated by the low pressure separator (8) to the booster stage of primary compressor (1);

a polyethylene discharge line (10) that is a line for discharging polyethylene separated by the low pressure separator (8); and an ethylene supply line (14) that is a line connected to the ethylene supply line (13) for supplying ethylene.

[6]

A method for manufacturing high pressure method polyethylene, the method including a high pressure recycle ethylene recycling step of supplying a part of recycle ethylene separated by a high pressure separator (5) to a secondary compressor (3) through a high pressure recycle ethylene line (6), decompressing the remaining recycle ethylene through an ethylene supply line (11), supplying the decompressed recycle ethylene to an ethylene holding drum (12), and supplying the decompressed recycle ethylene to a primary stage of primary compressor (2) through an ethylene supply line (13).

[7]

The manufacturing method according to [6], in which the high pressure recycle ethylene recycling step is a step of supplying 50% by weight or more and less than 100% by weight of recycle ethylene separated by the high pressure separator (5) to the secondary compressor (3) through the high pressure recycle ethylene line (6), decompressing the remaining (more than 0% by weight and 50% by weight or less of) recycle ethylene to a pressure within a range of 0.8 MPa to 3 MPa through the ethylene supply line (11), supplying the recycle ethylene decompressed to a pressure within a range of 0.8 MPa to 3 MPa to the ethylene holding drum (12), and supplying the decompressed recycle ethylene to the primary stage of primary compressor (2) through the ethylene supply line (13).

[8]

The manufacturing method according to [6] or [7], further including:

a compression step of compressing ethylene;

a reaction step of supplying compressed ethylene and a polymerization initiator to a reactor (4) to polymerize ethylene to generate polyethylene;

a separation step of separating polyethylene generated in the reactor (4) and recycle ethylene from each other by the high pressure separator (5), discharging the generated polyethylene from the high pressure separator (5), supplying the polyethylene to a low pressure separator (8) through a discharge line (7), separating recycle ethylene contained in polyethylene from the polyethylene by the low pressure separator (8), and discharging the polyethylene;

a low pressure recycle ethylene recycling step of supplying the low pressure recycle ethylene separated by the low pressure separator (8) to a booster stage of primary compressor (1) through a low pressure recycle ethylene line (9); and an ethylene supply step of supplying ethylene from an ethylene supply line (14) to an ethylene supply line (13).

[9]

The manufacturing method according to [8], in which the compression step is a step of compressing ethylene to a pressure within a range of 0.04 MPa to 3 MPa by the booster stage of primary compressor (1), compressing ethylene compressed by the booster stage of primary compressor (1) to a pressure within a range of 3 MPa to 20 MPa by the primary stage of primary compressor (2), and compressing ethylene compressed by the primary stage of primary compressor (2) to a pressure within a range of 20 MPa to 200 MPa by the secondary compressor (3).

[10]

The manufacturing method according to any one of [6] to [9], in which an apparatus for manufacturing high pressure method polyethylene is used.

The present invention can provide an apparatus and a method for manufacturing high-pressure method low-density polyethylene, the apparatus and the method having excellent characteristics that the amount of smoke generated during processing of a polyethylene polymer to be obtained is small, and the number of fish eyes contained in a film formed from the polymer is small.

BRIEF DESCRIPTION OF THE DRAWINGS

The FIGURE illustrates a schematic process diagram of an apparatus and a method for manufacturing high-pressure method low-density polyethylene according to an embodiment of the present invention.

DETAILED DESCRIPTION OF THE PREFERRED EMBODIMENTS

A manufacturing apparatus and a manufacturing method according to an embodiment of the present invention will be described in detail below with reference to the FIGURE. Ethylene gas is supplied to a polymerization reactor (4), and a polymerization initiator is added thereto to perform polymerization.

A polymerization mixture is released under reduced pressure from the polymerization reactor (4) to a high pressure separator (5), and separated into a generated polymer and recycle ethylene gas.

The generated polymer separated by the high pressure separator (5) is discharged into a low pressure separator (8) through a polyethylene discharge line (7), and further separated into polyethylene and recycle ethylene gas. The polyethylene is discharged through a polyethylene discharge line (10) and pelletized by a granulator.

The recycle ethylene gas separated by the low pressure separator (8) is supplied to a booster stage of primary compressor (1) through a low pressure recycle ethylene line (9), and the recycle ethylene gas is compressed and supplied to a primary stage of primary compressor (2) through an ethylene line (13).

A part of the recycle ethylene gas separated by the high pressure separator (5) is supplied to an inlet line of a secondary compressor (3) through a high pressure recycle ethylene line (6), and the remaining recycle ethylene gas is decompressed through an ethylene supply line (11) and supplied to a recycle ethylene holding drum (12). The recycle ethylene gas held by the recycle ethylene holding drum (12) is supplied to the primary stage of primary compressor (2) through the ethylene line (13).

Ethylene gas is supplied from an ethylene supply line (14) to the primary stage of primary compressor (2) through the ethylene line (13).

Mixed ethylene gas of the recycle ethylene gas supplied from the booster stage of primary compressor (1), the recycle ethylene gas supplied from the recycle ethylene holding drum (12), and the ethylene gas is compressed by the primary stage of primary compressor (2) and supplied to the secondary compressor (3).

Ethylene gas compressed by the secondary compressor (3) is supplied to the polymerization reactor (4) to continuously perform the polymerization reaction.

<Manufacturing Apparatus>

A manufacturing apparatus according to an embodiment of the present invention is an apparatus for manufacturing high pressure method polyethylene, the apparatus including:

an ethylene supply line (11) that is a line branched from a high pressure recycle ethylene line (6) and connected to a recycle ethylene holding drum (12) for decompressing high pressure recycle ethylene from the high pressure recycle ethylene line (6) and supplying the decompressed recycle ethylene to the recycle ethylene holding drum (12); and the recycle ethylene holding drum (12) that is a drum for holding the decompressed recycle ethylene through the ethylene supply line (11).

Booster Stage of Primary Compressor (1)

The booster stage of primary compressor (1) is a compressor that compresses ethylene to a pressure within a range of, for example, 0.04 MPa to 3 NPa.

Primary Stage of Primary Compressor (2)

The primary stage of primary compressor (2) is a compressor that compresses ethylene supplied from the booster stage of primary compressor (1) to a pressure within a range of, for example, 3 NPa to 20 MPa.

Secondary Compressor (3)

The secondary compressor (3) is a compressor that compresses ethylene supplied from the primary stage of primary compressor (2) to a pressure within a range of, for example, 20 MPa to 200 MPa.

Reactor (4)

The reactor (4) is a reactor that polymerizes ethylene with ethylene supplied from the secondary compressor (3) and a polymerization initiator supplied to the reactor (4) to manufacture polyethylene.

The reactor (4) may be either a tubular reactor or a tank-like reactor. The ethylene high pressure polymerization can be performed using a polymerization initiator such as oxygen or peroxide at a pressure of, for example, 20 MPa or more, preferably 100 to 500 MPa, more preferably 100 to 400 MPa, at a temperature of, for example, 100° C. or higher, preferably 100 to 400° C., more preferably 150 to 350° C., still more preferably 150 to 300° C.

An ethylene stream put into the reactor (4) can contain a comonomer and a chain transfer agent in addition to the polymerization initiator.

High Pressure Separator (5)

The high pressure separator (5) is a high pressure separator to which polyethylene obtained in the reactor (4) and recycle ethylene are supplied under reduced pressure from the reactor (4), and which separates the polyethylene and the high pressure recycle ethylene from each other A reaction generation mixture including a polymer generated in the reactor (4), recycle ethylene gas, a polymerization by-product, a solvent, a lubricating oil, and the like optionally passes through a pressure regulating valve, enters the high pressure separator (5) and is released under reduced pressure, and a part of the polymer contained in the reaction generation mixture is separated at a pressure of, for example, 10 to 100 MPa, preferably 50 to 100 MPa, more preferably 70 MPa or less, for example, at a temperature of 200 to 260° C.

The separated polymer contains almost no low-molecular-weight product having a weight average molecular weight of 5000 or less.

The polymer separated by the high pressure separator (5) is sent to the low pressure separator (8), recycle ethylene gas remaining in the polymer is separated and removed, and then the polymer from which the recycle ethylene gas has been removed is taken out as a product polyethylene from the polyethylene discharge line (10).

High Pressure Recycle Ethylene Line (6)

The high pressure recycle ethylene line (6) is a line for supplying high pressure recycle ethylene separated by the high pressure separator (5) to the secondary compressor (3).

Polyethylene Discharge Line (7)

The polyethylene discharge line (7) is a line for discharging polyethylene separated by the high pressure separator (5) from the high pressure separator (5) and supplying the polyethylene to the low pressure separator (8)

Low Pressure Separator (8)

The low pressure separator (8) is a separator that separates low pressure recycle ethylene contained in polyethylene separated by the high pressure separator (5) and supplied through the polyethylene discharge line (7) from the polyethylene.

Recycle gas separated into a head of the low pressure separator (8) by the low pressure separator (8) and having a temperature of, for example, about 200 to 250° C. is cooled to, for example, 20 to 50° C. by a cooler, and then sent to, for example, a separator, and impurities such as a solvent are removed from the recycle gas. Recycle gas ethylene from which impurities have been removed is returned to an inlet of the booster stage of primary compressor (1) through the low pressure recycle ethylene line (9).

Low Pressure Recycle Ethylene Line (9)

The low pressure recycle ethylene line (9) is a line for supplying low pressure recycle ethylene separated by the low pressure separator (8) to the booster stage of primary compressor (1). The inside of the low pressure recycle ethylene line (9) can be controlled to a pressure of, for example, 0.01 to 0.1 MPa and a temperature of, for example, 150 to 220° C.

Polyethylene Discharge Line (10)

The polyethylene discharge line (10) is a line for discharging polyethylene separated by the low pressure separator (8). Polyethylene discharged from the polyethylene discharge line (10) can be processed into a pellet product through an extruder, a cooler, a granulator, and the like. Polyethylene to be obtained can be low density polyethylene, for example, having a density of 910 to 920 kg/m$^3$.

Ethylene Supply Line (11)

The ethylene supply line (11) is a line branched from the high pressure recycle ethylene line (6) and connected to the recycle ethylene holding drum (12) for decompressing a part (for example, more than 0% by weight and 50% by weight or less, preferably 40% by weight or less, more preferably 30% by weight or less) of high pressure recycle ethylene from the high pressure recycle ethylene line (6) to a pressure within a range of 0.8 MPa to 3 MPa and supplying the decompressed recycle ethylene to the recycle ethylene holding drum (12).

Recycle Ethylene Holding Drum (12)

The recycle ethylene holding drum (12) is a drum for holding recycle ethylene decompressed to a pressure within a range of 0.8 MPa to 3 MPa at a temperature of, for example, −20° C. to 0° C. through the ethylene supply line (11).

Ethylene Supply Line (13)

The ethylene supply line (13) is a line for connecting the recycle ethylene holding drum (12) to the primary stage of primary compressor (2) and supplying decompressed recycle ethylene from the recycle ethylene holding drum (12) to the primary stage of primary compressor (2).

Ethylene Supply Line (14)

The ethylene supply line (14) is a line connected to the ethylene supply line (13) for supplying ethylene. For example, ethylene gas at 0.8 MPa to 3 MPa is supplied.

As an embodiment, a raw material ethylene gas is sent from the ethylene supply line (14) to the primary stage of primary compressor (2), compressed to, for example, a pressure within a range of 3 MPa to 20 MPa, and then further compressed to, for example, a pressure within a range of 20 MPa to 200 MPa by the secondary compressor (3). Gas pressurized to a polymerization pressure is sent to the reactor (4) and polymerized using oxygen or a peroxide initiator at a predetermined temperature of, for example, 150 to 300° C.

<Manufacturing Method>

A manufacturing method according to an embodiment of the present invention is a method for manufacturing high pressure method polyethylene, the method including a high pressure recycle ethylene recycling step of supplying a part of recycle ethylene separated by a high pressure separator (5) to a secondary compressor (3) through a high pressure recycle ethylene line (6), decompressing the remaining recycle ethylene through an ethylene supply line (11), supplying the decompressed recycle ethylene to an ethylene holding drum (12), and supplying the decompressed recycle ethylene to a primary stage of primary compressor (2) through an ethylene supply line (13).

Compression Step

A compression step is not limited to one stage, and may include a step of performing compression in two or more stages.

For example, the compression step is a step of compressing ethylene to a pressure within a range of 0.04 MPa to 3 MPa by the booster stage of primary compressor (1), compressing ethylene compressed by the booster stage of primary compressor (1) to a pressure within a range of 3 MPa to 20 MPa by the primary stage of primary compressor (2), and compressing ethylene compressed by the primary stage of primary compressor (2) to a pressure within a range of 20 MPa to 200 MPa by the secondary compressor (3).

Reaction Step

A reaction step is a step of supplying ethylene compressed by the secondary compressor (3) and a polymerization initiator to the reactor (4) to polymerize ethylene to generate polyethylene As detailed operating conditions of the reaction step, the conditions described in the above description of the reactor (4) can be applied.

Separation Step

A separation step is a step of separating polyethylene generated in the reactor (4) and recycle ethylene from each other by the high pressure separator (5), discharging the generated polyethylene from the high pressure separator (5) and supplying the polyethylene to the low pressure separator (8) through the discharge line (7), and separating recycle ethylene contained in polyethylene from the polyethylene by the low pressure separator (8), and discharging the polyethylene.

As detailed operating conditions of the separation step in the high pressure separator (5) and the low pressure separator (8), the conditions described in the above description of the high pressure separator (5) and the low pressure separator (8) can be applied.

High Pressure Recycle Ethylene Recycling Step

The high pressure recycle ethylene recycling step is a step of supplying a part (for example, 50% by weight or more and less than 100% by weight, preferably 60% by weight or more, more preferably 70% by weight or more) of recycle ethylene separated by the high pressure separator (5) to the secondary compressor (3) through the high pressure recycle ethylene line (6), and decompressing the remaining (for example, more than 0% by weight and 50% by weight or less, preferably 40% by weight or less, more preferably 30% by weight or less of) recycle ethylene to a pressure within a range of 0.8 MPa to 3 MPa through the ethylene supply line (11), supplying the recycle ethylene decompressed to a pressure within a range of 0.8 MPa to 3 MPa to the ethylene holding drum (12), and supplying the decompressed recycle ethylene to the primary stage of primary compressor (2) through the ethylene supply line (13).

As detailed operating conditions of the high pressure recycle ethylene recycling step, the conditions described in the above description of the high pressure recycle ethylene line (6), the ethylene supply line (11), the ethylene holding drum (12), and the ethylene supply line (13) can be applied.

Low Pressure Recycle Ethylene Recycling Step

A low pressure recycle ethylene recycling step is a step of supplying low pressure recycle ethylene separated by the low pressure separator (8) to the booster stage of primary compressor (1) through the low pressure recycle ethylene line (9).

As detailed operating conditions of the low pressure recycle ethylene recycling step, the conditions described in the above description of the low pressure separator (8) and the low pressure recycle ethylene line (9) can be applied.

Ethylene Supply Step

An ethylene supply step is a step of supplying ethylene from the ethylene supply line (14) to the ethylene supply line (13), and supplying the ethylene to the primary stage of primary compressor (2) through the ethylene supply line (13).

As detailed operating conditions of the ethylene supply step, the conditions described in the above description of the ethylene supply line (14) and the ethylene supply line (13) can be applied.

the present invention can be performed using a high pressure ethylene polymerization apparatus including a high pressure circulating gas system.

In the present invention, all polymerization initiators and chain transfer agents known to be used for polymerization or copolymerization of ethylene can be used.

<Polymerization Initiator>

In the present invention, all polymerization initiators known to be used for polymerization or copolymerization of ethylene can be used.

Suitable examples of the polymerization initiator include hydrogen peroxide, an organic peroxide such as lauroyl peroxide, dipropionyl peroxide, benzoyl peroxide, di-tertiary-butyl peroxide, tertiary-butyl hydroperoxide, trimethylhexanoyl peroxide, diisopropylperoxydicarbonate, tertiary-butyl peracetate, or tertiary-butyl perisobutyrate, molecular oxygen, an azo compound such as azobisisobutyronitrile or azoisobutylvaleronitrile, t-butyl peroxybenzoate, t-butyl peroxy-2 ethylhexanoate, t-butyl peroxyisopropyl carbonate, and oxygen.

<Chain Transfer Agent>

In the present invention, all chain transfer agents known to be used for polymerization or copolymerization of ethylene can be used.

Suitable examples of the chain transfer agent include a paraffin hydrocarbon such as ethane, propane, butane, heptane, hexane, or pentane; an α-olefin such as propylene, butene-1, hexene-1, or 3-methylbutene-1; an aldehyde such as formaldehyde, acetaldehyde, propylene aldehyde, or n-butyraldehyde; a ketone such as acetone, methyl ethyl ketone, diethyl ketone, diisopropyl ketone, cyclohexanone, or methyl isopropyl ketone; an aromatic hydrocarbon; and a chlorinated hydrocarbon.

<Comonomer>

The apparatus and the method according to an embodiment of the present invention can also be applied to copolymerization of ethylene and another comonomer that can be copolymerized with ethylene.

In the present invention, for example, all comonomers known to be copolymerized with ethylene, such as a compound having an ethylenically unsaturated group, including acrylic acid, methacrylic acid, and alkyl esters thereof, acrylonitrile, methacrylonitrile, acrylamide, methacrylamide, vinyl chloride, vinylidine chloride, vinyl fluoride, vinyl acetate, vinyl propionate, an N-vinylimide compound, a vinyl aryl compound, a vinyl ether compound, a vinyl ketone compound, and the like, can be used.

The comonomer can be used so as to be contained in a copolymer to be obtained in an amount of more than 0% by weight and about 50% by weight or less, preferably about 40% by weight or less, more preferably about 30% by weight or less, still more preferably about 20% by weight or less.

The comonomer can be added to any unit and step. The comonomer can be added to, for example, a unit and a step from a periphery of the compressor to a periphery of the reactor.

EXAMPLES

Example 1

Ethylene gas was supplied to the polymerization reactor (4) at 34,000 kg/Hr, and t-butyl peroxybenzoate was added thereto as an initiator at a pressure of 141 to 163 MPa at a temperature of 245 to 265° C. to perform polymerization. A polymer generating rate was 8,000 kg/Hr.

A polymerization mixture was released from the polymerization reactor (4) to the high pressure separator (5) at 20 MPa and separated into a generated polymer and recycle ethylene gas at 230° C.

The generated polymer separated by the high pressure separator (5) was discharged into the low pressure separator (8) at 0.03 MPa through the polyethylene discharge line (7), and further separated into polyethylene and recycle ethylene gas at 200° C. The polyethylene was discharged through the polyethylene discharge line (10) and pelletized by a granulator.

The recycle ethylene gas separated by the low pressure separator (8) was supplied to the booster stage of primary compressor (1) at 0.03 MPa through the low pressure recycle ethylene line (9), and the recycle ethylene gas was compressed to a pressure of 2.6 MPa and supplied to the primary stage of primary compressor (2) through the ethylene line (13).

The recycle ethylene gas separated by the high pressure separator (5) was decompressed to a pressure of 19 MPa through the high pressure recycle ethylene line (6), 82% by weight of the recycle ethylene gas was supplied to an inlet line of the secondary compressor (3), and the remaining 18% by weight of the recycle ethylene gas was decompressed to a pressure of 2.6 MPa through the ethylene supply line (11) and supplied to the recycle ethylene holding drum (12) at a temperature of −12° C. The recycle ethylene gas at 2.6 MPa held by the recycle ethylene holding drum (12) was supplied to the primary stage of primary compressor (2) through the ethylene line (13).

Ethylene gas at 2.6 MPa was supplied from the ethylene supply line (14) to the primary stage of primary compressor (2) through the ethylene line (13).

Mixed ethylene gas of the recycle ethylene gas supplied from the booster stage of primary compressor (1), the recycle ethylene gas supplied from the recycle ethylene holding drum (12), and the ethylene gas was compressed to a pressure of 19 MPa by the primary stage of primary compressor (2) and supplied to the secondary compressor (3).

Ethylene gas compressed to a pressure of 178 MPa by the secondary compressor (3) was supplied to the polymerization reactor (4) to continuously perform the polymerization reaction.

Comparative Example 1

Ethylene gas was supplied to the polymerization reactor (4) at 33,000 kg/Hr, and t-butyl peroxybenzoate was added thereto as an initiator under at a pressure of 141 to 163 MPa at a temperature of 245 to 265° C. to perform polymerization. A polymer generating rate was 8,000 kg/Hr.

A polymerization mixture was released from polymerization reactor (4) to the high pressure separator (5) at 19 MPa and separated into the generated polymer and recycle ethylene gas at 230° C.

The generated polymer separated by the high pressure separator (5) was discharged into the low pressure separator (8) at 0.03 MPa through the polyethylene discharge line (7), and further separated into polyethylene and recycle ethylene gas at 200° C. The polyethylene was discharged through the polyethylene discharge line (10) and pelletized by a granulator.

The recycle ethylene gas separated by the low pressure separator (8) was supplied to the booster stage of primary compressor (1) at 0.03 MPa through the low pressure recycle ethylene line (9), and the recycle ethylene gas was compressed to a pressure of 2.6 MPa and supplied to the primary stage of primary compressor (2) through the ethylene line (13).

The recycle ethylene gas separated by the high pressure separator (5) was decompressed to a pressure of 18 MPa through the high pressure recycle ethylene line (6), and the entire amount (100% by weight) of the recycle ethylene gas was supplied to an inlet line of the secondary compressor (3).

Ethylene gas at 2.6 MPa was supplied from the ethylene supply line (14) to the primary stage of primary compressor (2) through the ethylene line (13).

Mixed ethylene gas of the recycle ethylene gas supplied from the booster stage of primary compressor (1) and the ethylene gas was compressed to a pressure of 18 MPa by the primary stage of primary compressor (2) and supplied to the secondary compressor (3).

Ethylene gas compressed to a pressure of 178 MPa by the secondary compressor (3) was supplied to the polymerization reactor (4) to continuously perform the polymerization reaction.

Example 2

Ethylene gas was supplied to the polymerization reactor (4) at 34,000 kg/Hr, and t-butyl peroxybenzoate was added thereto as an initiator at a pressure of 130 to 147 MPa at a temperature of 240 to 265° C. to perform polymerization. A polymer generating rate was 8,000 kg/Hr.

A polymerization mixture was released from the polymerization reactor (4) to the high pressure separator (5) at 19 MPa and separated into a generated polymer and recycle ethylene gas at 200° C.

The generated polymer separated by the high pressure separator (5) was discharged into the low pressure separator (8) at 0.03 MPa through the polyethylene discharge line (7), and further separated into polyethylene and recycle ethylene gas at 180° C. The polyethylene was discharged through the polyethylene discharge line (10) and pelletized by a granulator.

The recycle ethylene gas separated by the low pressure separator (8) was supplied to the booster stage of primary compressor (1) at 0.03 MPa through the low pressure recycle ethylene line (9), and the recycle ethylene gas was compressed to a pressure of 2.7 MPa and supplied to the primary stage of primary compressor (2) through the ethylene line (13).

The recycle ethylene gas separated by the high pressure separator (5) was decompressed to a pressure of 19 MPa through the high pressure recycle ethylene line (6), 84% by weight of the recycle ethylene gas was supplied to an inlet line of the secondary compressor (3), and the remaining 16% by weight of the recycle ethylene gas was decompressed to a pressure of 2.7 MPa through the ethylene supply line (11) and supplied to the recycle ethylene holding drum (12) at a temperature of −7° C. The recycle ethylene gas at 2.7 MPa held by the recycle ethylene holding drum (12) was supplied to the primary stage of primary compressor (2) through the ethylene line (13).

Ethylene gas at 2.7 MPa was supplied from the ethylene supply line (14) to the primary stage of primary compressor (2) through the ethylene line (13).

Mixed ethylene gas of the recycle ethylene gas supplied from the booster stage of primary compressor (1), the recycle ethylene gas supplied from the recycle ethylene holding drum (12), and the ethylene gas was compressed to a pressure of 19 MPa by the primary stage of primary compressor (2) and supplied to the secondary compressor (3).

Ethylene gas compressed to a pressure of 165 MPa by the secondary compressor (3) was supplied to the polymerization reactor (4) to continuously perform the polymerization reaction.

Comparative Example 2

Ethylene gas was supplied to the polymerization reactor (4) at 33,000 kg/Hr, and t-butyl peroxybenzoate was added thereto as an initiator under at a pressure of 131 to 147 MPa at a temperature of 240 to 265° C. to perform polymerization. A polymer generating rate was 9,000 kg/Hr.

A polymerization mixture was released from polymerization reactor (4) to the high pressure separator (5) at 19 MPa and separated into the generated polymer and recycle ethylene gas at 210° C.

The generated polymer separated by the high pressure separator (5) was discharged into the low pressure separator (8) at 0.03 MPa through the polyethylene discharge line (7), and further separated into polyethylene and recycle ethylene gas at 190° C. The polyethylene was discharged through the polyethylene discharge line (10) and pelletized by a granulator.

The recycle ethylene gas separated by the low pressure separator (8) was supplied to the booster stage of primary compressor (1) at 0.03 MPa through the low pressure recycle ethylene line (9), and the recycle ethylene gas was compressed to a pressure of 2.7 MPa and supplied to the primary stage of primary compressor (2) through the ethylene line (13).

The recycle ethylene gas separated by the high pressure separator (5) was decompressed to a pressure of 17 MPa through the high pressure recycle ethylene line (6), and the entire amount (100% by weight) of the recycle ethylene gas was supplied to an inlet line of the secondary compressor (3).

Ethylene gas at 2.7 MPa was supplied from the ethylene supply line (14) to the primary stage of primary compressor (2) through the ethylene line (13).

Mixed ethylene gas of the recycle ethylene gas supplied from the booster stage of primary compressor (1) and the ethylene gas was compressed to a pressure of 17 MPa by the primary stage of primary compressor (2) and supplied to the secondary compressor (3).

Ethylene gas compressed to a pressure of 163 MPa by the secondary compressor (3) was supplied to the polymerization reactor (4) to continuously perform the polymerization reaction.

<Method for Analyzing and Measuring Polyethylene>

Polyethylene discharged through the discharge line (10) and pelletized by a granulator was analyzed by the following method.

(1) Method for Measuring Density (Unit: kg/m$^3$)

Annealing was performed in accordance with JIS K6922-2, and then a density was measured by Method A by the method specified in JIS K7112.

(2) Method for Measuring Melt Flow Rate (MFR) (Unit: g/10 min)

A melt flow rate was measured by Method A at a temperature of 190° C. under a load of 2.16 kg by the method specified in JIS K7210-1.

(3) Method for Measuring Heptane Extraction Amount

Into a 500 mL Erlenmeyer flask, 100 g of each pellet and 250 mL of n-heptane (manufactured by Kanto Chemical Co., Inc.) were put, and the mixture was allowed to stand in a thermostatic chamber at 30° C. for 90 hours. A collected extract was concentrated so as to have a volume of 50 mL using a rotary evaporator, poured into a pre-dried aluminum cup, and dried on a water bath at 70° C. Thereafter, the dried product was dried at 105° C. for 30 minutes and then cooled in a desiccator for 30 minutes. The measured mass of the product was divided by the original mass of 100 g, and the obtained value was converted into a percentage to be taken as a heptane extraction amount.

(4) Smoke Generation Test During Film Processing

A coat hanger type horizontal die (die width: 200 mm, die lip: 1.5 mm) was attached to a Φ 30 mm extruder manufactured by Union Plastics Corporation, and a processing temperature was set to 260° C. Each pellet was extruded from the extruder at 7 kg/hour, smoke generated in one minute was collected, and the amount of smoke generated was measured using a digital dust meter LD-5D manufactured by Shibata Scientific Co., Ltd. As the amount of smoke generated, a value obtained by averaging five measurement values was used.

(5) Method for Measuring Fish Eye (FE) of Blown Film

Each pellet was extruded at a discharge rate of 5 kg/hour at a processing temperature of 150° C. using an blown film processing machine (extruder: EX-30 type screw: 30 mmΦ, L/D=28, die lip: 0.8 mm) manufactured by Placo Co. Ltd. to form a film having a thickness of 50 μm. A film processing line was irradiated with light from a light source unit. An image thereof was input by a line sensor camera XCM 6060 SAT2-V3-F-N manufactured by Nippon Electro-Sensory Device Corp. installed in the line, and defects were detected by an image processing device SCANTEC-Elements 2 manufactured by Nagase Industry Co., Ltd. As threshold identification conditions, (clear): 0, (white): 0, (black): −20, and (dark black): 0 were used. As for the size, that having a diameter of 200 μm or more was counted as FE.

Results

TABLE 1

| | Example 1 | Comparative Example 1 | Example 2 | Comparative Example 2 |
|---|---|---|---|---|
| Density (kg/m³) | 919.8 | 918.7 | 919.4 | 919.7 |
| Melt flow rate (g/10 min) | 1.4 | 1.5 | 19.6 | 19.4 |
| Recycle ethylene is supplied to drum (12) or not | Supplied | Not supplied | Supplied | Not supplied |
| Heptane extraction amount (wt %) | 0.29 | 0.31 | 0.46 | 0.47 |
| Smoke generation test (counts/min) | 35 | 52 | 571 | 722 |
| FE counter during formation of 30 mm inflation film (pieces/m²) | 10.8 | 14.7 | 5.7 | 11.8 |

The apparatus and the method for manufacturing high-pressure method low-density polyethylene according to an embodiment of the present invention have excellent characteristics that in ethylene high pressure polymerization, low molecular weight impurities including a polymerization by-product, a solvent, a lubricating oil, and the like are economically and effectively separated and removed from an ethylene high pressure polymer, the amount of smoke generated during processing of a polyethylene polymer to be obtained is small, and the number of fish eyes contained in a film formed from the polymer is small. Therefore, polyethylene to be manufactured is particularly preferably used as a material for a film, and is suitably used for applications such as various films, various automobile interior and exterior parts, various parts of household electric appliances, various housing equipment parts, various industrial parts, and various building material parts, and have high applicability in various industrial fields such as household goods, transportation machine industry, electrical and electronic industry, and building and construction industry.

What is claimed is:

1. An apparatus for manufacturing high pressure method polyethylene, the apparatus comprising:
    an ethylene supply line (11) that is a line branched from a high pressure recycle ethylene line (6) and connected to a recycle ethylene holding drum (12) for decompressing high pressure recycle ethylene from the high pressure recycle ethylene line (6) and supplying the decompressed recycle ethylene to the recycle ethylene holding drum (12); and
    the recycle ethylene holding drum (12) that is a drum for holding the decompressed recycle ethylene through the ethylene supply line (11).

2. The manufacturing apparatus according to claim 1, wherein
    the ethylene supply line (11) is a line branched from the high pressure recycle ethylene line (6) and connected to the recycle ethylene holding drum (12) for decompressing more than 0% by weight and 50% by weight or less of high pressure recycle ethylene from the high pressure recycle ethylene line (6) to a pressure within a range of 0.8 MPa to 3 MPa and supplying the decompressed recycle ethylene to the recycle ethylene holding drum (12).

3. The manufacturing apparatus according to claim 1, wherein
    the recycle ethylene holding drum (12) is a drum for holding recycle ethylene decompressed to a pressure within a range of 0.8 MPa to 3 MPa at a temperature of −20° C. to 0° C. through the ethylene supply line (11).

4. The manufacturing apparatus according to claim 1, further comprising:
    a primary stage of primary compressor (2) that is a compressor that further compresses ethylene supplied from a booster stage of primary compressor (1);
    a high pressure recycle ethylene line (6) that is a line for supplying high pressure recycle ethylene separated by a high pressure separator (5) to a secondary compressor (3); and
    an ethylene supply line (13) that is a line for connecting the recycle ethylene holding drum (12) to the primary stage of primary compressor (2) and supplying decompressed recycle ethylene from the recycle ethylene holding drum (12) to the primary stage of primary compressor (2).

5. The manufacturing apparatus according to claim 1, further comprising:
    a booster stage of primary compressor (1) that is a compressor that compresses ethylene;
    a secondary compressor (3) that is a compressor that further compresses ethylene supplied from the primary stage of primary compressor (2);
    a reactor (4) that is a reactor that polymerizes ethylene using ethylene supplied from the secondary compressor (3) and a polymerization initiator supplied to the reactor (4) to manufacture polyethylene;
    a high pressure separator (5) that is a high pressure separator to which polyethylene obtained in the reactor (4) and recycle ethylene are supplied from the reactor (4) and which separates the polyethylene and the high pressure recycle ethylene from each other;
    a polyethylene discharge line (7) that is a line for discharging polyethylene separated by the high pressure separator (5) from the high pressure separator (5) and supplying the polyethylene to a low pressure separator (8);

the low pressure separator (8) that is a separator that separates low pressure recycle ethylene contained in polyethylene separated by the high pressure separator (5) and supplied through the polyethylene discharge line (7) from the polyethylene;

a low pressure recycle ethylene line (9) that is a line for supplying low pressure recycle ethylene separated by the low pressure separator (8) to the booster stage of primary compressor (1);

a polyethylene discharge line (10) that is a line for discharging polyethylene separated by the low pressure separator (8); and an ethylene supply line (14) that is a line connected to an ethylene supply line (13) for supplying ethylene.

6. A method for manufacturing high pressure method polyethylene, the method comprising a high pressure recycle ethylene recycling step of supplying a part of recycle ethylene separated by a high pressure separator (5) to a secondary compressor (3) through a high pressure recycle ethylene line (6), decompressing the remaining recycle ethylene through an ethylene supply line (11), supplying the decompressed recycle ethylene to an ethylene holding drum (12), and supplying the decompressed recycle ethylene to a primary stage of primary compressor (2) through an ethylene supply line (13).

7. The manufacturing method according to claim 6, wherein the high pressure recycle ethylene recycling step is a step of supplying 50% by weight or more and less than 100% by weight of recycle ethylene separated by the high pressure separator (5) to the secondary compressor (3) through the high pressure recycle ethylene line (6), decompressing the remaining (more than 0% by weight and 50% by weight or less of) recycle ethylene to a pressure within a range of 0.8 MPa to 3 MPa through the ethylene supply line (11), supplying the recycle ethylene decompressed to a pressure within a range of 0.8 MPa to 3 MPa to the ethylene holding drum (12), and supplying the decompressed recycle ethylene to the primary stage of primary compressor (2) through the ethylene supply line (13).

8. The manufacturing method according to claim 6, further comprising:

a compression step of compressing ethylene;

a reaction step of supplying compressed ethylene and a polymerization initiator to a reactor (4) to polymerize ethylene to generate polyethylene;

a separation step of separating polyethylene generated in the reactor (4) and recycle ethylene from each other by the high pressure separator (5), discharging the generated polyethylene from the high pressure separator (5), supplying the polyethylene to a low pressure separator (8) through a discharge line (7), separating recycle ethylene contained in polyethylene from the polyethylene by the low pressure separator (8), and discharging the polyethylene;

a low pressure recycle ethylene recycling step of supplying the low pressure recycle ethylene separated by the low pressure separator (8) to a booster stage of primary compressor (1) through a low pressure recycle ethylene line (9); and an ethylene supply step of supplying ethylene from an ethylene supply line (14) to an ethylene supply line (13).

9. The manufacturing method according to claim 8, wherein the compression step is a step of compressing ethylene to a pressure within a range of 0.04 MPa to 3 MPa by the booster stage of primary compressor (1), compressing ethylene compressed by the booster stage of primary compressor (1) to a pressure within a range of 3 MPa to 20 MPa by the primary stage of primary compressor (2), and compressing ethylene compressed by the primary stage of primary compressor (2) to a pressure within a range of 20 MPa to 200 MPa by the secondary compressor (3).

10. The manufacturing method according to claim 6, wherein an apparatus for manufacturing high pressure method polyethylene is used.

* * * * *